(12) United States Patent
Yamamoto et al.

(10) Patent No.: US 8,767,410 B2
(45) Date of Patent: Jul. 1, 2014

(54) ELECTRONIC DEVICE

(75) Inventors: Nobuhiro Yamamoto, Tokyo (JP); Tsuyoshi Kozai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 196 days.

(21) Appl. No.: 13/191,131

(22) Filed: Jul. 26, 2011

(65) Prior Publication Data

US 2012/0155040 A1    Jun. 21, 2012

(30) Foreign Application Priority Data

Dec. 21, 2010   (JP) .................................. 2010-285162

(51) Int. Cl.
| | | |
|---|---|---|
| H05K 7/14 | (2006.01) | |
| H05K 7/18 | (2006.01) | |
| H05K 5/00 | (2006.01) | |
| H05K 1/00 | (2006.01) | |
| H05K 1/18 | (2006.01) | |
| H05K 7/00 | (2006.01) | |

(52) U.S. Cl.
USPC ............ 361/799; 361/752; 361/748; 174/263

(58) Field of Classification Search
CPC . H05K 9/0039; H05K 1/0215; H05K 9/0016; H05K 9/0067; H05K 2201/10409; H05K 1/144; H05K 3/368; H05K 1/141; H05K 1/145; H05K 7/142; H05K 7/1417; H05K 3/3447; H05K 3/284; H05K 1/117; H05K 3/3452; H05K 2201/09781; H05K 3/0052; H05K 1/112; H05K 3/429; H05K 2201/096; H05K 1/115; H05K 3/4602; G06F 1/184; G06F 1/181; H01L 2924/3011; H01L 2924/01078
USPC .......................................... 361/799; 174/263
See application file for complete search history.

(56) References Cited

U.S. PATENT DOCUMENTS

| | | | | | |
|---|---|---|---|---|---|
| 4,631,640 | A | * | 12/1986 | Umetsu et al. | ................. 361/814 |
| 4,851,614 | A | * | 7/1989 | Duncan, Jr. | .................... 174/263 |
| 4,927,367 | A | * | 5/1990 | Salvagno | ......................... 439/92 |
| 5,326,937 | A | * | 7/1994 | Watanabe | ...................... 174/263 |
| 5,866,844 | A | * | 2/1999 | Osterbrock et al. | ............ 174/51 |

(Continued)

FOREIGN PATENT DOCUMENTS

| | | |
|---|---|---|
| JP | H 098488 | 1/1997 |
| JP | 10-107673 | 4/1998 |
| JP | 2004028239 | 1/2004 |
| JP | 2008-027551 | 2/2008 |

OTHER PUBLICATIONS

Machine translation of JP 09-008488 A; Miura Hironari.*

(Continued)

*Primary Examiner* — Jenny L Wagner
*Assistant Examiner* — Ahmad D Barnes
(74) *Attorney, Agent, or Firm* — Blakely, Sokoloff, Taylor & Zafman LLP

(57) ABSTRACT

According to one embodiment, an electronic device is provided with: an electronic substrate on which electronic components are provided; a screw including a screw head portion and a threaded portion, and configured to be engaged to the electronic substrate; a conducting member provided between the screw head portion and the electronic substrate and configured to electrically connect the screw head portion and the electronic substrate; and an electrical wiring line provided between the screw head portion and the electronic substrate and configured so as not to be electrically connected to the screw head portion.

19 Claims, 14 Drawing Sheets

(56) References Cited

U.S. PATENT DOCUMENTS

2007/0285911 A1* 12/2007 Feist et al. .................... 361/836
2008/0080128 A1* 4/2008 Chikazawa et al. ........... 361/683
2009/0219703 A1* 9/2009 Ishii et al. ..................... 361/753

OTHER PUBLICATIONS

Japanese Patent Application No. 2010-285162, Notice of Reasons for Refusal, mailed Jan. 8, 2013, (with English Translation).

* cited by examiner

ELECTRONIC DEVICE

CROSS REFERENCE TO RELATED
APPLICATION(S)

The application is based upon and claims the benefit of priority from Japanese Patent Application No. 2010-285162 filed on Dec. 21, 2010; the entire content of which are incorporated herein by reference.

FIELD

Embodiments described herein relate generally to an electronic device.

BACKGROUND

In an electronic device, an electronic substrate disposed with electronic components is housed inside a case.

The density with which electronic components and the like are mounted on electronic substrates for electronic devices has recently been getting higher and higher.

Electronic substrates are engaged (fixed) to cases with screws, for example, and generally copper foil portions are exposed at screw fastening portions of the electronic substrate in order to connect to ground.

However, proportion of copper foil surface area occupied in the screw fastening portions is relatively higher for substrates mounted at high density, and an issue arises as to how to increase the density of mounting for an electronic substrate of an electronic device by efficiently utilizing the copper foil in a state not impeding the GND (ground) function.

BRIEF DESCRIPTION OF THE DRAWINGS

Exemplary embodiments of the present invention will be described in detail based on the following figures, wherein.

DETAILED DESCRIPTION OF THE
EMBODIMENTS

In general, according to one exemplary embodiment, an electronic device is provided with: an electronic substrate on which electronic components are provided; a screw including a screw head portion and a threaded portion, and configured to be engaged to the electronic substrate; a conducting member provided between the screw head portion and the electronic substrate and configured to electrically connect the screw head portion and the electronic substrate; and an electrical wiring line provided between the screw head portion and the electronic substrate and configured so as not to be electrically connected to the screw head portion.

Explanation follows regarding exemplary embodiments, with reference to the drawings.

Figure 1:
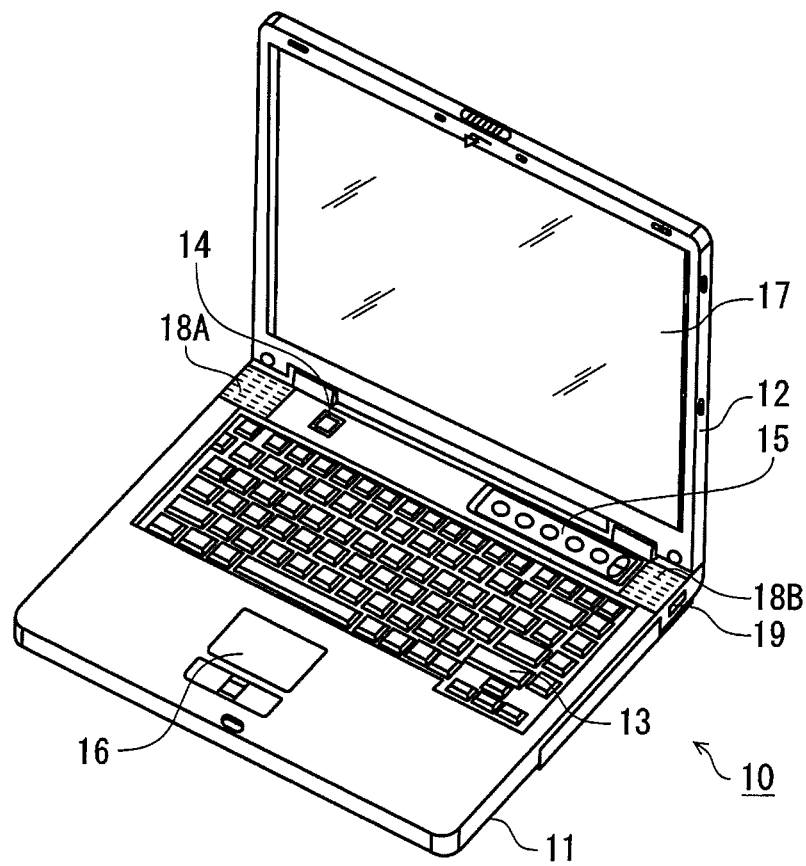
FIG. 1 is a diagram showing an external appearance of an electronic device according to an exemplary embodiment.

FIG. 1 is a drawing showing an external appearance of an electronic device according to an exemplary embodiment. The electronic device is, for example, configured by a notebook style personal computer (notebook PC) 10.

The exemplary embodiment is not limited to a personal computer and is applicable to a TV, mobile phone or other portable electronic device.

As shown in FIG. 1, the personal computer (notebook PC) 10 includes a computer (notebook PC) body 11 and a display unit 12. A Liquid Crystal Display (LCD) 17 is incorporated in the display unit 12. The display unit 12 is attached to the computer (notebook PC) body 11 such that it can swing between an open position in which a top face of the computer (notebook PC) body 11 is exposed, and a closed position in which the display unit 12 covers the top face of the computer (notebook PC) body 11.

The computer (notebook PC) body 11 has a thin box-shaped case. The case of the body 11 houses an electronic substrate, described later.

The top face of the body 11 is laid out for example with a keyboard 13, a power button 14 for switching ON or OFF power to the computer (notebook PC) 10, an input operation panel 15, a touch pad 16, and speakers 18A, 18B. Various operation buttons are disposed in the input operation panel 15.

A USB connector 19 is provided at a right hand side of the computer (notebook PC) body 11 for connecting to a Universal Serial Bus (USB) cable or a USB device conforming to, for example, the USB 2.0 specification.

An external display connection terminal (not shown in the drawings) conforming, for example, to a High Definition Multimedia Interface (HDMI) specification is provided at a back face of the computer (notebook PC) body 11. The external display connection terminal is employed to output a digital picture signal to an external display.

Figure 2:
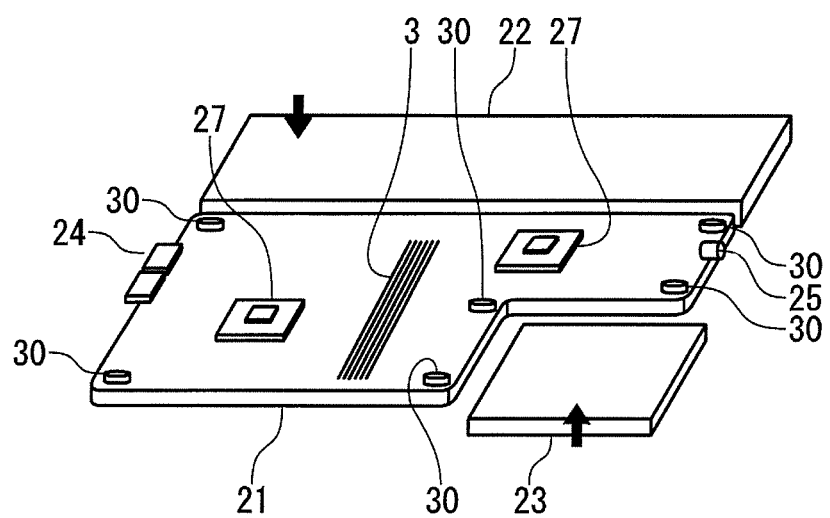
FIG. 2 is a diagram showing an external appearance of an electronic substrate for housing in the electronic device.

FIG. 2 is a diagram showing an external appearance of an electronic substrate housed in the electronic device according to the exemplary embodiment.

An electronic substrate 21 is housed in the electronic device 10. The electronic substrate 21 is laid out with electronic components, such as an external I/O connector component 24, a CPU 27, a power source connector 25, and electrical wiring lines 3.

Screw fastening portions 30, described later, are provided to the electronic substrate 21 for engaging (fixing) the electronic substrate 21 to the computer (notebook PC) body 11 with screws 1.

A battery 22 is provided to supply power for driving the electronic device 10. A storage device 23 is provided to the electronic device 10 for data storage. A HDD or SDD is, for example, employed for the storage device 23.

The electronic substrate 21, the battery 22 and the storage device 23 are housed in the main case 11.

Figure 3A:
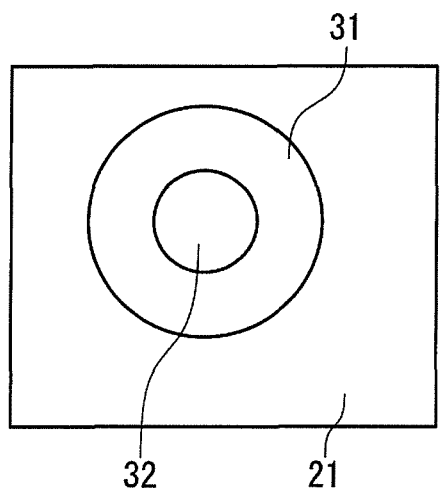
FIGS. 3A and 3B are explanatory diagrams showing a general structure for engaging an electronic substrate of an electronic device to a case with screws.
Figure 3B:
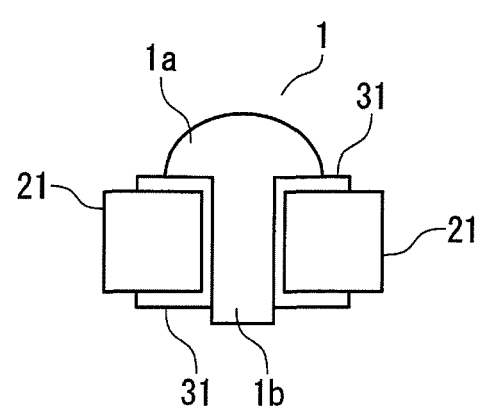

FIGS. 3A and 3B are explanatory diagrams showing a general structure for engaging the electronic substrate of the electronic device to the case with screws.

Each of the screws 1 includes a screw head 1a and a threaded portion 1b, and the electronic substrate 21 is formed with copper foil (GND) portions 31 and screw fastening holes 32.

The screws 1 have a leading end, called a "tip", and a "shaft", configured by a threaded portion and connected circular cylinder shaped portion. A wide portion, referred to as a "head", is provided at the end of the shaft, with the boundary between the head and the shaft referred to as a "neck".

The screws 1 in the present exemplary embodiment employ "male threads". Portions of the screws 1 are generally classified into portions of a "head" (head portion), a "shaft" cut with a thread ridges, and a "tip" at the leading end, with the "neck" being the portion between the head and the shaft. For ease of explanation, the portion corresponding to the above "head" (head portion) is referred to as a screw head 1a, and the portions corresponding to the "shaft", "tip" and "neck" are referred to as a threaded portion 1b.

FIG. 3A is a plan view showing a screw fastening portion 30 configured on the top face of the electronic substrate 21, as viewed from above.

The screw fastening holes 32 are provided in the electronic substrate 21 for insertion with the threaded portions 1b of the screws 1. The periphery of the screw fastening holes 32 is configured with an electrically conducting member, such as a copper foil 31 formed from a metal film including copper.

FIG. 3B is a cross-section showing the screw fastening portion 30 configured in the electronic substrate 21, as viewed from the side.

The threaded portion 1b of each of the screws 1 is inserted into the respective screw fastening hole 32 of the electronic substrate 21, engaging and fixing the electronic substrate 21 to the main case 11, and the screw heads 1a are thereby grounded (connected to GND) by contact with the copper foil 31.

This means that grounding (connecting to GND) is performed by contact between the copper foil (GND) portions 31 and the screws 1.

Figure 4A:
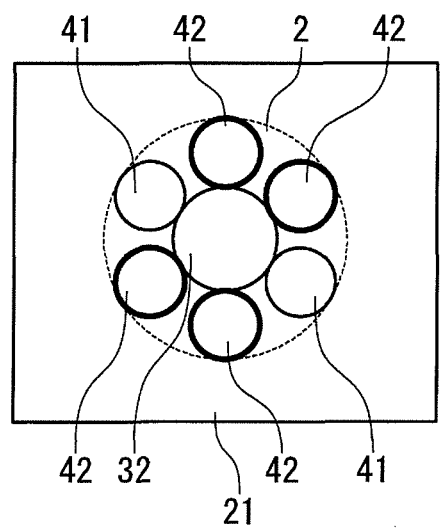
FIGS. 4A and 4B are explanatory diagrams showing a structure for engaging an electronic substrate of an electronic device according to the exemplary embodiment to a case with screws.
Figure 4B:
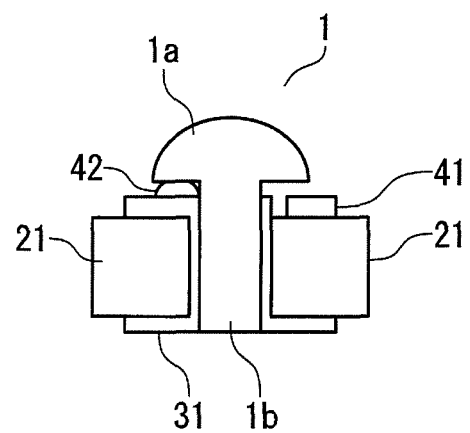

FIGS. 4A and 4B are explanatory diagrams showing a structure for engaging the electronic substrate of the electronic device of an exemplary embodiment to a case with screws.

Each under-screw-head region 2 includes copper foil (test land) portions 41 and solder (GND) portions 42.

In the present exemplary embodiment, as shown in FIG. 4A, the solder (GND) portions 42 are configured above the copper foil (GND) portions 31 of the electronic substrate 21. The size of the solder (GND) portions 42 is, for example, a diameter of about 1 mm, and a height of about 0.1 mm to 0.25 mm.

The copper foil portions 41 are configured on the electronic substrate 21 for use as test lands, as described later. The copper foil (test land) portions 41 are, for example, configured with about the same height as the copper foil (GND) portions 31, and configured with a lower height than the combination of the copper foil (GND) portions 31 and the solder (GND) portions 42. Namely, the combined height of the copper foil (GND) portions 31 and the solder (GND) portions 42 is higher than the height of the copper foil (test land) portions 41.

Configuration here is with four of the solder (GND) portions 42, and two of the copper foil (test land) portions 41, formed in a substantially symmetrical configuration.

At least a portion of each of the solder (GND) portions 42 and a portion of each of the copper foil (test lands) 41 are formed in the under-screw-head region 2.

The screw heads 1a are usually disposed with substantially no space in the under-screw-head region 2. In the present exemplary embodiment, due to the screw heads 1a being mechanically engaged (fixed) to the solder (GND) portions 42, it is possible to dispose electrical wiring lines in the under-head regions 2, as described later, thus contributing to higher mounting density on the electronic substrate.

The screw heads 1a and the electronic substrate 21 are electrically connected through the solder (GND) portions 42.

The threaded portion 1b of each of the screws 1 is inserted into the respective screw fastening hole 32 of the electronic substrate 21, engaging (fixing) the electronic substrate 21 to the main case 11 as described above. However, setting the combined height here of the height copper foil (GND) portions 31 and the solder (GND) portions 42 higher than the height of the copper foil (test land) portions 41 enables a configuration in which the copper foil (test land) portions 41 and the screws 1 are in a non-contact state, while the solder (GND) portions 42 and the screw heads 1a are in contact with each other.

Figure 5A:
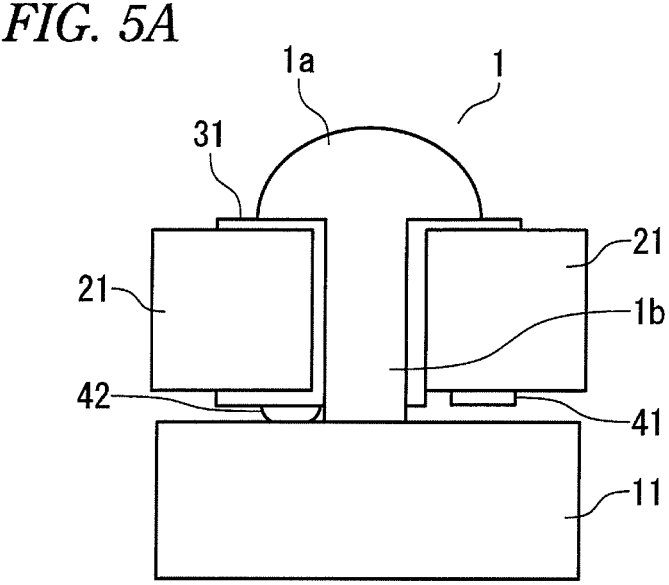
FIGS. 5A and 5B are explanatory diagrams showing other examples of structures for engaging an electronic substrate of an electronic device according to the exemplary embodiment to a case with screws.
Figure 5B:
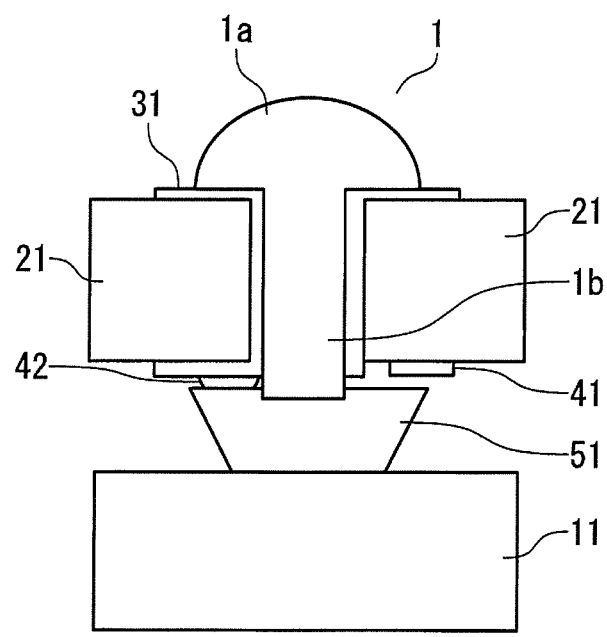

FIGS. 5A and 5B are explanatory diagrams of other examples of structures for engaging an electronic substrate of an electronic device according to other exemplary embodiments to a case with screws.

FIG. 5A is a cross-section of the screw fastening portion 30 configured in the electronic substrate 21, as viewed from the side.

A main case 11 is illustrated in FIG. 5A.

Similarly to in the configuration described above, the present exemplary embodiment is configured as shown in FIG. 5A such that the solder (GND) portions 42 and the main case 11 are in contact with each other, while the copper foil (test land) portions 41 and the main case 11 are not in contact with each other.

FIG. 5B is a cross-section of the screw fastening portion 30 configured in the electronic substrate 21, as viewed from the side.

A stud 51 is illustrated in FIG. 5B.

Similarly to in the configuration described above, the present exemplary embodiment is configured as shown in FIG. 5B such that the solder (GND) portions 42 and the stud 51 are in contact with each other, while the copper foil (test land) portions 41 and the stud 51 are not in contact with each other.

Figure 6A:
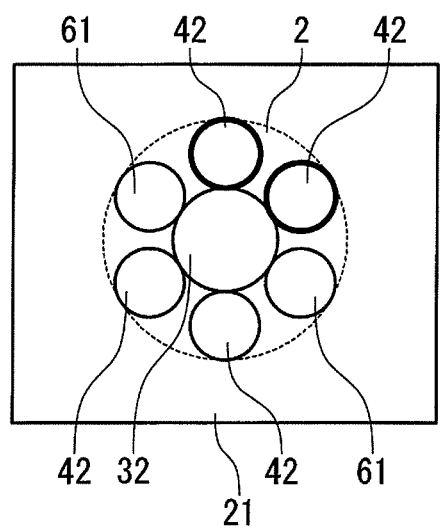
FIGS. 6A and 6B are explanatory diagrams showing another example of a structure for engaging an electronic substrate of an electronic device according to the exemplary embodiment to a case with screws.
Figure 6B:
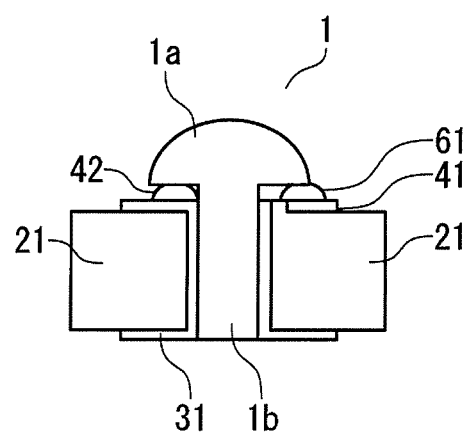

FIGS. 6A and 6B are explanatory diagrams showing another example of a structure for engaging an electronic substrate of an electronic device according to an exemplary embodiment to a case with screws.

FIG. 6A is a plan view of a screw fastening portion 30 configured on the top face of the electronic substrate 21, as viewed from above.

FIG. 6B is a cross-section of the screw fastening portion 30 configured in the electronic substrate 21, as viewed from the side.

A bonding agent 61 is illustrated in FIG. 6B. The bonding agent 61 is employed for covering the copper foil (test land) portions 41.

It is also preferably in such a configuration to set the combined height of the copper foil (GND) portions 31 and the solder (GND) portions 42 higher than the combined height of the copper foil (test land) portions 41 and the bonding agent 61. However, due to the solder (GND) portions 42 being formed from a substance that is harder than the bonding agent 61, the resulting combined height after fastening of the copper foil (GND) portions 31 and the solder (GND) portions 42 should be higher than the combined height after fastening of the copper foil (test land) portions 41 and the bonding agent 61.

Such a configuration enables the solder (GND) portions 42 and the screw head 1a to be placed in contact with each other. The copper foil (test land) portions 41 are covered by the bonding agent 61, enabling a configuration to be achieved in which the copper foil (test land) portions 41 are not in contact with the screws 1.

The present exemplary embodiment is hence configured such that the copper foil (test land) portions 41 covered by the bonding agent 61 and in a non-contact state with the screws 1. Disposing bonding agent at location where electrically contact should be prevented enables both an insulation function to be performed as well as enabling loosening of the screws 1 to be prevented.

Figure 7:
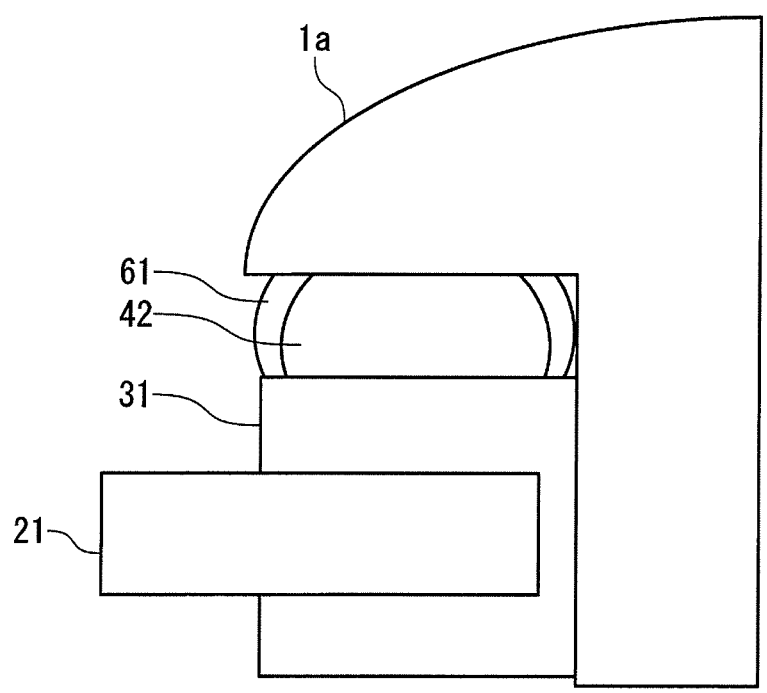
FIG. 7 is an explanatory diagram showing another example of a structure for engaging an electronic substrate of an electronic device according to the exemplary embodiment to a case with screws.

FIG. 7 is an explanatory diagram showing another example of a structure for engaging an electronic substrate of an electronic device according to an exemplary embodiment to a case with screws.

FIG. 7 is a cross-section of a screw fastening portion 30 configured in the electronic substrate 21, as viewed from the side.

In the present exemplary embodiment, bonding agent 61 is applied to the solder (GND) portions 42 as a covering.

A similar effect is obtained thereby as to that of the above FIGS. 6A and 6B.

Figure 8:
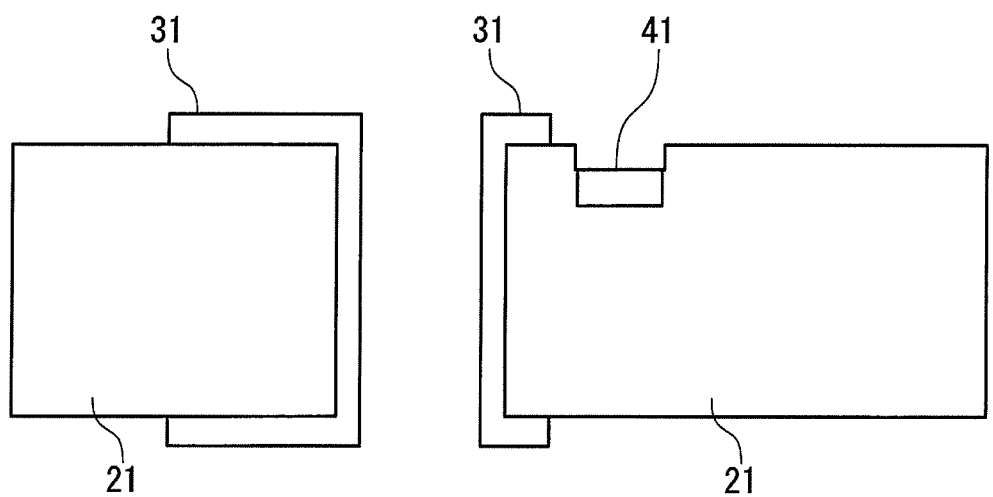
FIG. 8 is an explanatory diagram showing another example of a structure for engaging an electronic substrate of an electronic device according to the exemplary embodiment to a case with screws.

FIG. 8 is an explanatory diagram of another example of a structure for engaging an electronic substrate of an electronic device according to an exemplary embodiment to a case with screws.

As shown in FIG. 8, indentations and projections are provided to the electronic substrate 21, as an example of an structure enabling the screws 1 and the copper foil (GND) portions 31 to be placed in contact, while the screws 1 and the copper foil (test land) portions 41 are in a non-contact state.

As shown in FIG. 8, for example, by not projecting the copper foil (test land) portions 41 right up to the surface, a configuration is achieved such that the screws 1 and the copper foil (test land) portions 41 are not in contact with each other.

Figure 9A:
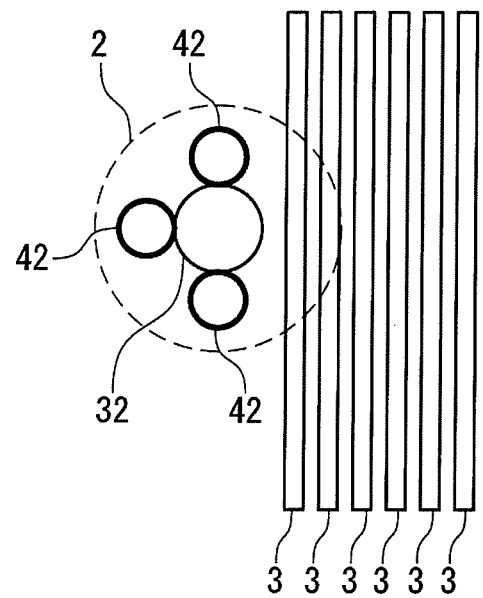
FIGS. 9A and 9B are explanatory diagrams showing other examples of structures for engaging an electronic substrate of an electronic device according to the exemplary embodiment to a case with screws.
Figure 9B:
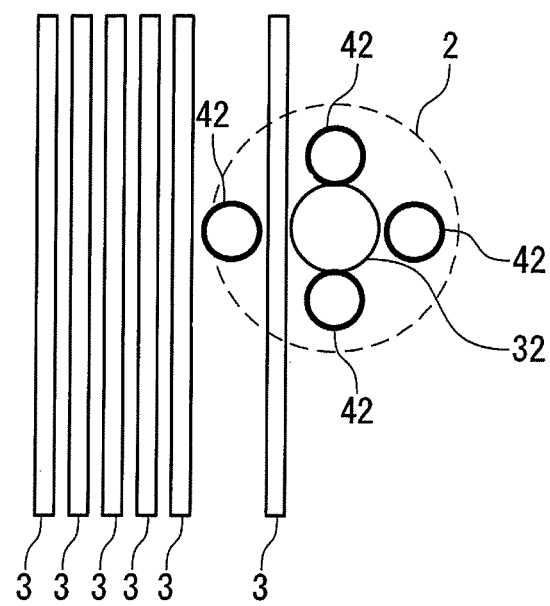

FIGS. 9A and 9B are explanatory diagrams showing other examples of structures for engaging an electronic substrate of an electronic device according to an exemplary embodiment to a case with screws.

Electrical wiring lines 3 are provided. For example, plural of the electrical wiring lines 3 are configured on the electronic substrate 21.

In the present exemplary embodiment, at least a portion of the electrical wiring lines 3 is disposed in the under-screw-head region 2 of the electronic substrate 21.

In the present exemplary embodiment, a space is secured by the above configuration enabling a portion of the electrical wiring lines 3 to be disposed in the under-screw-head region 2.

In the present exemplary embodiment, a conducting member (solder (GND) portion 42) is thus provided between the screw head 1a and the main case 11, and a configuration is achieved in which the screw heads 1a are electrically connected to and mechanically support by the main case 11.

In the present exemplary embodiment, the electrical wiring lines 3 are provided between the screw head 1a and the main case 11, however, due to the lifted state using the conducting member (solder (GND) portion 42)) securing a space, configuration is possible such that the screw head 1a and the electrical wiring lines 3 not electrically connected.

FIG. 9A shows an example in which electrical wiring lines 3 are disposed in a region of the under-screw-head region 2 at a portion where there are no solder (GND) portions 42 disposed.

FIG. 9B shows an example in which electrical wiring lines 3 are disposed between one solder (GND) portion 42 placed in the under-screw-head region 2 and other solder (GND) portions 42 placed in the same under-screw-head region 2.

Figure 10A:
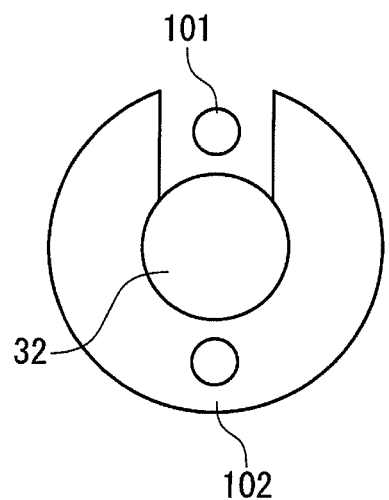
FIGS. 10A and 10B are explanatory diagrams showing other examples of modes of use for the copper foil portions provided in the screw fastening portions of an electronic substrate according to an exemplary embodiment.
Figure 10B:
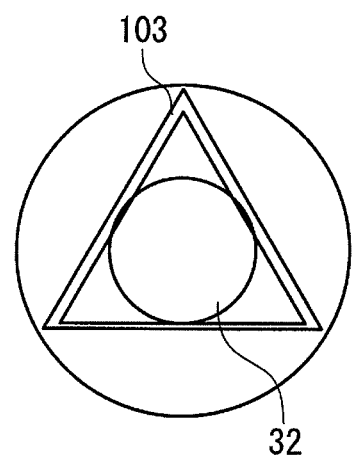

FIGS. 10A and 10B are explanatory diagrams showing other examples of modes of use of copper foil portions provided in screw fastening portions for an electronic substrate of exemplary embodiments.

These exemplary embodiments are examples where the shapes of the copper foil (test land) portions 41 provided in the electronic substrate 21 are formed to enable use as identification marks or marks indicating a specification.

An identification mark (copper foil type) 101 and an identification mark (copper foil removal type) 102 are shown in FIG. 10A.

A lead-free, halogen-free mark 103 is shown in FIG. 10B.

By adopting such a configuration, in addition to application to test lands application can also be made, for example, to configuration of fiducial marks (positioning marks) in the screw fastening portion 30 for automatic machine reading, thereby enabling a more compact electronic substrate 21 to be achieved.

Figure 11A:
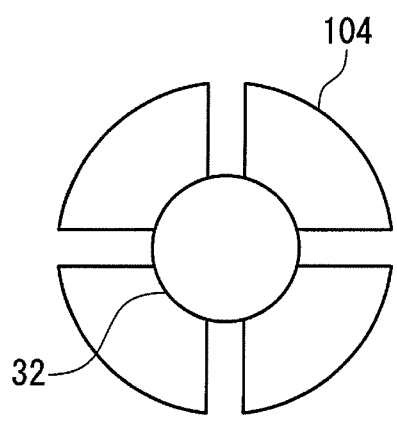
FIGS. 11A and 11B are explanatory diagrams showing other examples of modes of use for the copper foil portions provided in the screw fastening portions of an electronic substrate according to an exemplary embodiment.
Figure 11B:
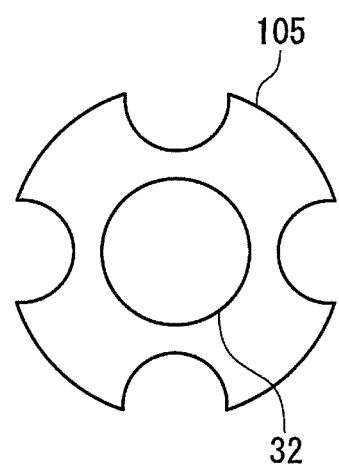

FIGS. 11A and 11B are explanatory diagrams showing other modes of use with examples of copper foil portions provided in screw fastening portions of an electronic substrate according to exemplary embodiments.

These exemplary embodiments are other examples where the shapes of the copper foil (test land) portions 41 provided to the electronic substrate 21 are formed to enable use as identification marks or marks indicating a specification.

An identification mark (copper foil type) 104 is shown in FIG. 11A.

An identification mark (copper foil type) 105 is shown in FIG. 11B.

Adopting such a configuration enables application to configuration of fiducial marks (positioning marks) by modifying the test lands.

Figure 12A:
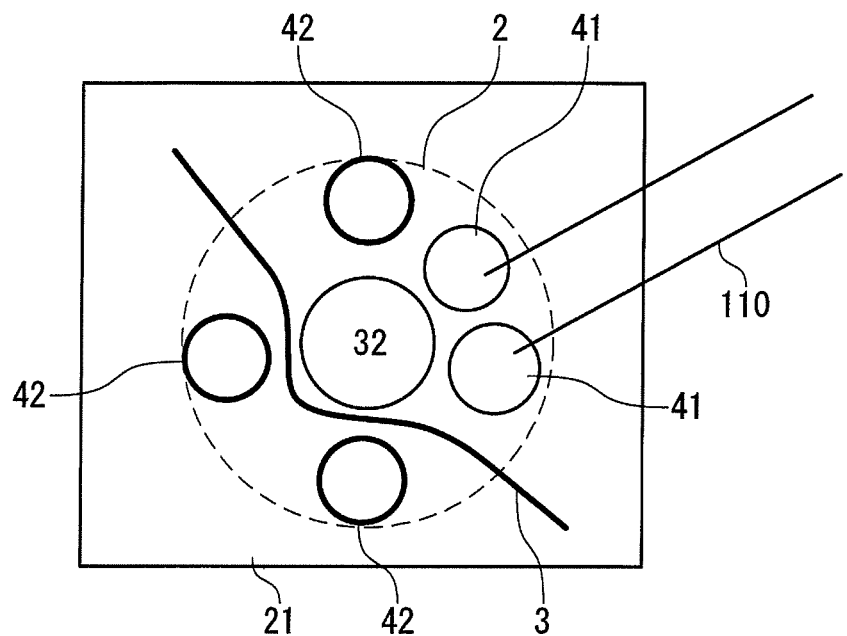
FIGS. 12A and 12B are explanatory diagrams showing another example of a structure for engaging an electronic substrate of an electronic device according to the exemplary embodiment to a case with screws.
Figure 12B:
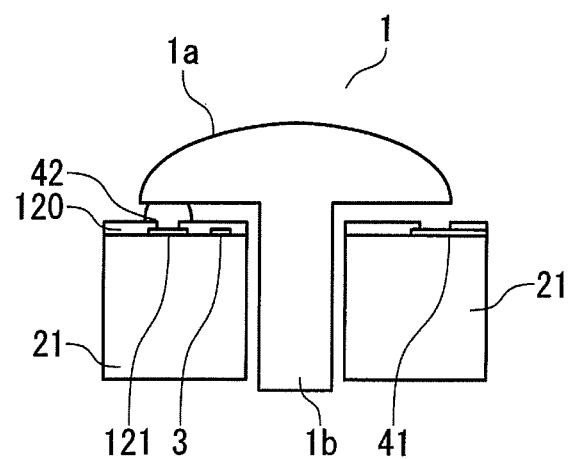

FIGS. 12A and 12B are explanatory diagrams showing an example of a structure for engaging an electronic substrate of an electronic device according to an exemplary embodiment to a case with screws.

A resist 120 is provided to the electronic substrate 21. An electrical wiring line (copper wiring line) 3 is configured by a copper wiring line.

In the present exemplary embodiment, a portion of the electrical wiring (copper wiring line) 3 is provided on the electronic substrate 21 under the resist 120.

FIG. 12A is a plan view of a screw fastening portion 30 configured in the electronic substrate 21, as viewed from above.

Similarly to exemplary embodiments above, the solder (GND) portions 42 and copper foil (test land) portions 41 are provided in the under-screw-head region 2 of the electronic substrate 21.

The electrical wiring line (copper wiring line) 3 is provided in the under-screw-head region 2 of the electronic substrate 21. The electrical wiring line (copper wiring line) 3 is also disposed between the solder (GND) portions 42 and the screw fastening hole 32 so as not to make contact with the solder (GND) portions 42.

The copper foil (test land) portions 41 are provided in the under-screw-head region 2 of the electronic substrate 21. The electrical wiring line (copper wiring line) 3 is also disposed so as not to make contact with the copper foil (test land) portions 41.

Test pins 110 are shown in FIG. 12A.

Testing of wiring in the electronic substrate 21 is performed, for example, by making electrical contact between the copper foil (test land) portions 41 and the test pins 110.

FIG. 12B is a cross-section of the screw fastening portion 30 configured in the electronic substrate 21, as viewed from the side.

As shown in FIG. 12B, the electrical wiring line (copper wiring line) 121 is provided on the electronic substrate 21, and the electrical wiring line (copper wiring line) 121 is both electrically and mechanically connected to the screw head 1a through the solder (GND) portions 42.

The resist 120 is configured on the electronic substrate 21 so as to include a portion on the electrical wiring line (copper wiring line under the resist 120) 3, and the electrical wiring line (copper wiring line under the resist 120) 3 is provided under the resist 120.

The resist 120 is configured on the electronic substrate 21 to include a portion on the copper foil portions 41, and the copper foil portions 41 are provided below the resist 120.

Figure 13:
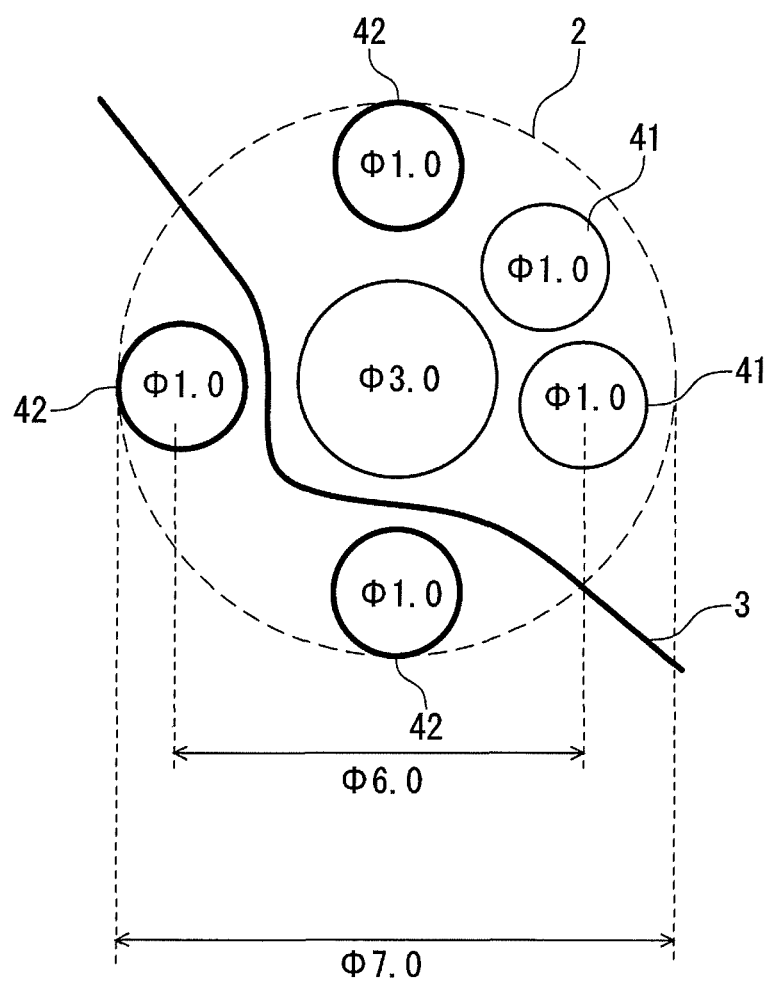
FIG. 13 is an explanatory diagram showing another example of a structure for engaging an electronic substrate of an electronic device according to the exemplary embodiment to a case with screws.

FIG. 13 is an explanatory diagram showing an example of a structure for engaging an electronic substrate of an electronic device according to an exemplary embodiment to a case with screws.

As shown in FIG. 13, similarly to as described above, the solder (GND) portions 42 and the copper foil (test land) portions 41 are provided in the under-screw-head region 2 of the electronic substrate 21.

Dimensions are, for example, as follows. Diameter of under-screw-head region 2: 7.0 mm; diameter of screw fastening hole 32: 3.0 mm; respective diameters of solder (GND) portions 42 and copper foil (test land) portions 41: 1.0 mm; separation distance between the center of the solder (GND) portions 42 in FIG. 13 and the centers of the copper foil (test land) portions 41: 6.0 mm.

Explanation in the present exemplary embodiment is based on a printed wiring board for a consumer electronic product as the electronic substrate 21, formed with lands in an over-resist.

The lands for connection to GND (solder (GND) portions 42) accordingly are formed with a design diameter of 1.0 mm to give stable solder feed with a metal mask. The lands for use in testing (copper foil (test land) portions 41) similarly also have a design diameter of 1.0 mm. However, the diameter of the copper foil (test land) portions 41 is determined according to the thickness of the test pins 110 and so may be configured less than the diameter of 1.0 mm. The wiring lines have a pattern width of 0.1 mm, and standard design execution rules for pattern gaps of 0.1 mm are employed.

As described above, the test lands (the copper foil (test land) portions 41) are lands employed for electrical testing the printed wiring board and the test pins 110 make contact with the test lands.

The test lands (the copper foil (test land) portions 41) are required to ensure the quality of printed wiring boards, however there is no need for the copper foil (test land) portions 41 to be exposed above the electronic substrate in a normal operating state when the electronic substrate is employed in the operation of a standard consumer product.

The test lands (the copper foil (test land) portions 41) may accordingly be hidden under the screw heads 1a in the final assembled product. However, there is a requirement to ensure that the test lands (the copper foil (test land) portions 41) do not make contact with the screw heads 1a in order to isolate from the product circuits.

Consequently, configuration is made such that the solder portions 42 are fed onto to the screw fastening portions 30 so as to form, for example, terminals projecting by about 0.2 mm, such that the screws 1 are raised up from the surface of the electronic substrate (the printed wiring board) 21.

The test lands (the copper foil (test land) portions 41) may be coated with a bonding agent in order to increase the degree of isolation of the test lands (the copper foil (test land) portions 41), or to strengthen fastening of the screw fastening portions 30.

FIGS. 14A to 14D are explanatory diagrams showing an example of test method for an electronic substrate of an electronic device of an exemplary embodiment.

Figure 14A:
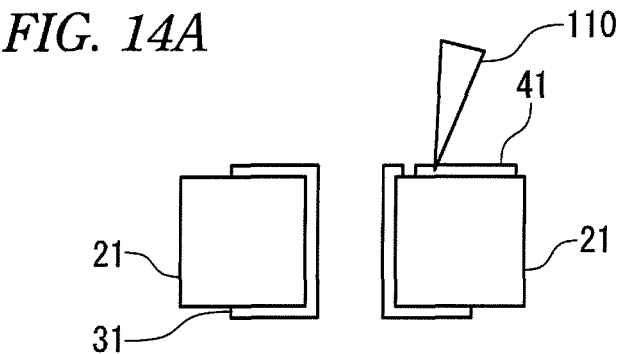
FIGS. 14A to 14D are explanatory diagrams showing an example of a test method for an electronic substrate of an electronic device according to the exemplary embodiment.

FIG. 14A shows a step for testing the electronic substrate 21. Electrical testing is performed here, for example, by contacting respective test pins 110 against the copper foil (test land) portions 41.

Figure 14B:
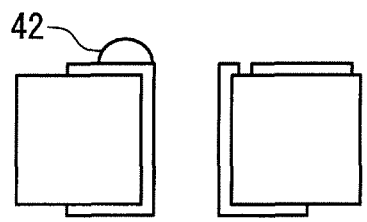

FIG. 14B shows a step in which the solder (GND) portion 42 is formed on one of the copper foil (GND) portions 31 on the electronic substrate 21.

Figure 14C:
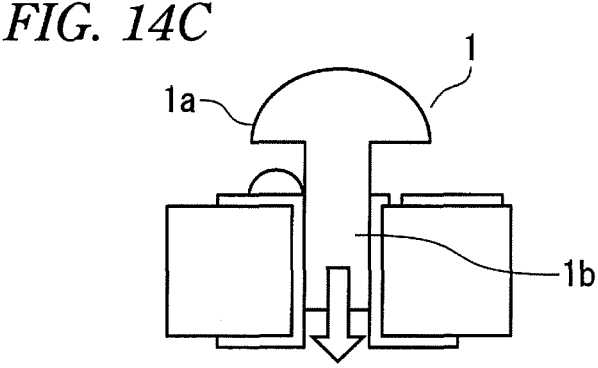

FIG. 14C shows a step in which the threaded portion 1b of the screw 1 is engaged (fixed) to the screw fastening hole 32 of the electronic substrate 21.

Figure 14D:
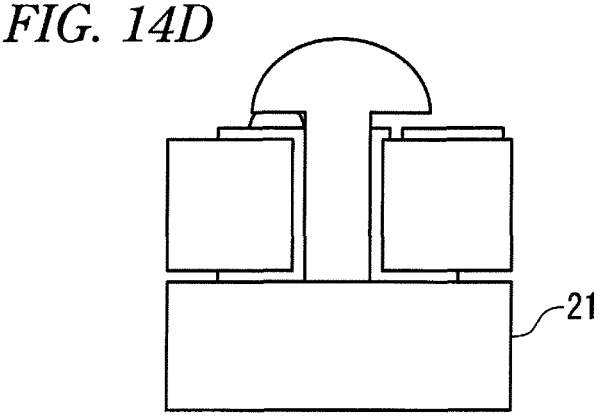

FIG. 14D shows a step in which the electronic substrate 21 has completed assembly, the screw 1 is engaged (fixed) to the electronic substrate 21, and there is both electrical and mechanical contact between the screw head 1a and the solder (GND) portion 42.

As explained above, the solder 42 which is a conducting member, in the present exemplary embodiment, is provided at the under-screw-head region 2 of the screw fastening portion 30 of the electronic substrate 21, between the screw head 1a and the electronic substrate 21 to give both electrical and mechanical connection between the screw head 1a and the electronic substrate 21.

Providing an electrical wiring line that is not electrically connected to the screw head 1a in space that has thereby been secured enables the mounting density of the electronic substrate 21 to be raised.

By, for example, employing the solder 42 to give a height difference, damage occurring to the electrical wiring lines 3 is reduced, enabling the risk of shorting to be reduced.

The surface area of the electronic substrate 21 is reduced by the above, enabling a more compact and lighter electronic device 10 to be achieved.

Adopting the configurations described above enables a higher mounting density to be achieved by application of embodiments described herein to an electronic substrate.

While certain embodiment has been described, the exemplary embodiment has been presented by way of example only, and is not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic device comprising:
   an electronic substrate on which electronic components are provided;
   a screw including a screw head portion and a threaded portion, and configured to be engaged to the electronic substrate by inserting the threaded portion into a screw fastening hole provided in the electronic substrate;
   a conducting member provided between the screw head portion and the electronic substrate and configured to electrically connect the screw head portion and the electronic substrate;
   a mark member formed in an under-screw-head region on a surface of the electronic substrate around the screw fastening hole as a conductive pattern, the mark member configured for use in testing or positioning of the electronic substrate; and
   an electrical wiring line provided between the screw head portion and the electronic substrate and configured so as not to be electrically connected to the screw head portion.

2. The device of claim 1, wherein the screw is configured to be fixed by engaging the threaded portion with the electronic substrate.

3. The device of claim 1, wherein the screw is configured to be grounded by the conducting member.

4. The device of claim 1, wherein the conducting member is configured to be mechanically fixed to a portion of the electronic substrate.

5. The device of claim 1, wherein the screw head portion is configured to be supported by the conducting member.

6. The device of claim 1, wherein the electrical wiring line is configured so as not to be electrically connected to the conducting member.

7. The device of claim 1, wherein the electrical wiring line is configured to be separated from the screw head portion.

8. The device of claim 1, wherein the conducting member is provided on the electronic substrate.

9. The device of claim 1, wherein the conducting member includes a solder component.

10. An electronic device comprising:
    an electronic substrate on which electronic components are provided;
    a screw including a screw head portion and a threaded portion, and configured to be engaged to the electronic substrate by inserting the threaded portion into a screw fastening hole provided in the electronic substrate;
    a conducting member provided between the screw head portion and the electronic substrate and configured to electrically connect the screw head portion to the electronic substrate;
    a mark member formed in an under-screw-head region on a surface of the electronic substrate around the screw fastening hole as a conductive pattern, the mark member configured for use in testing or positioning of the electronic substrate;
    an electrical wiring line provided between the screw head portion and the electronic substrate and configured so as not to be electrically connected to the screw head portion; and
    a case for housing the electronic substrate.

11. An electronic device comprising:
    an electronic substrate on which electronic components are provided, the electronic substrate being adapted to receive a screw that includes a screw head portion and a threaded portion;
    a conducting member provided between the screw head portion and the electronic substrate and configured to electrically connect the screw head portion and the electronic substrate;
    a mark member contained within a region on a surface of the electronic substrate that is (i) situated under the screw head portion and proximate to the screw fastening hole when the electronic substrate receives the screw and (ii) formed as a conductive pattern, the mark member configured for use in testing or positioning of the electronic substrate; and
    an electrical wiring line provided between the screw head portion and the electronic substrate and configured so as not to be electrically connected to the screw head portion.

12. The electronic device of claim 11, wherein the screw is configured to be fixed by engaging the threaded portion with the electronic substrate.

13. The electronic device of claim 11, wherein the screw is configured to be grounded by the conducting member.

14. The electronic device of claim 11, wherein the conducting member is configured to be mechanically fixed to a portion of the electronic substrate.

15. The electronic device of claim 11, wherein the screw head portion is configured to be supported by the conducting member.

16. The electronic device of claim 11, wherein the electrical wiring line is configured so as not to be electrically connected to the conducting member.

17. The electronic device of claim 11, wherein the electrical wiring line is configured to be separated from the screw head portion.

18. The electronic device of claim 11, wherein the conducting member is provided on the electronic substrate.

19. The electronic device of claim 11, wherein the conducting member includes a solder component.

* * * * *